Dec. 29, 1953 D. RICHMAN 2,664,471

WIDE BAND DIRECT CURRENT REPEATER

Filed June 12, 1951 2 Sheets-Sheet 1

INVENTOR.
DONALD RICHMAN
BY Laurence B. Dodds
ATTORNEY

Dec. 29, 1953 D. RICHMAN 2,664,471

WIDE BAND DIRECT CURRENT REPEATER

Filed June 12, 1951 2 Sheets-Sheet 2

INVENTOR.
DONALD RICHMAN
BY Laurence B. Dodds
ATTORNEY

Patented Dec. 29, 1953

2,664,471

UNITED STATES PATENT OFFICE 2,664,471

WIDE-BAND DIRECT-CURRENT REPEATER

Donald Richman, Flushing, N. Y., assignor to Hazeltine Research, Inc., Chicago, Ill., a corporation of Illinois Application June 12, 1951, Serial No. 231,202

5 Claims. (Cl. 179—171)

*General*

Figures 1, 3, 4:
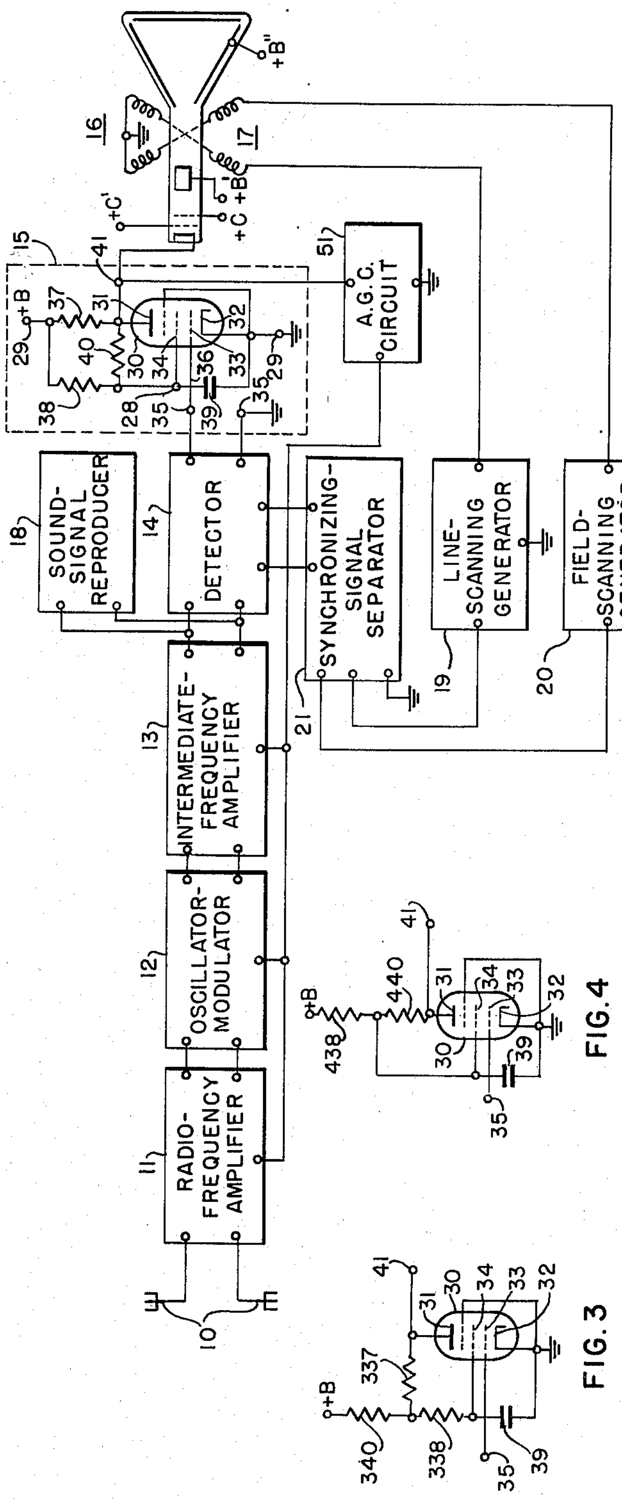

The present invention relates to wide-band direct-current repeaters and, particularly, to repeaters for translating a signal having components in a wide range of frequencies including low-frequency or substantially direct-current components. The invention has particular application to directly coupled video-frequency amplifiers for use in television receivers and will be described in that environment.

The conventional composite television signal intercepted by a television receiver comprises a carrier-wave signal modulated during recurrent trace periods with video-frequency and low-frequency or direct-current components, representing light variations in an image being televised and its average background illumination, respectively. During the intervening retrace periods the carrier signal is modulated with synchronizing-signal components. The lower limit of the modulation range used to transmit video-frequency components conventionally designates white in an image and its upper limit corresponds to black in the image. Fluctuations in the carrier-wave amplitude representative of average or background illumination usually are of low frequency being essentially direct-current fluctuations and a decrease in the amplitude of the carrier wave within the modulation range just mentioned denotes an increase in illumination. The final portion of the carrier amplitude, the portion exceeding the black level, transmits the synchronizing signals.

At the receiver the described composite signal is detected and its video-frequency modulation components, the components between the white and black levels, are utilized to modulate the intensity of the beam of a cathode-ray type reproducing device. The synchronizing components of the signal control the scanning apparatus at the receiver and synchronize the scanning of its cathode-ray beam with the corresponding operation of similar apparatus utilized at the transmitter in developing the transmitted signal. In addition the peak level of the synchronizing signals is utilized to develop an automatic-gain-control (AGC) potential to control the gain of the receiver amplifier stages. In this manner the transmitted image is reconstructed at the receiver.

The video-frequency modulation components include a wide range of frequencies, normally 0-4 megacycles, including the low-frequency components previously mentioned. In order that a faithful reconstruction of the televised image occur, and proper AGC potentials be developed, it is required that all of the video-frequency modulation components and the synchronizing signals be translated from the detector to the reproducing device in a uniform manner. In some conventional television receivers such translation is effected by suppressing the direct-current components and utilizing a direct-current reinsertion circuit at the cathode-ray tube to reinsert the low-frequency or direct-current components not translated. More recently, directly coupled video-amplifier stages have been used to translate the full range of modulation components. In the latter case, it is essential that the signal-translating characteristics of such stages be uniform with respect to both the direct-current components, representative of the background illumination of the image, the variation in peak level of the synchronizing signals and the higher frequency components.

Conventional television receivers normally utilize one stage of video-frequency amplification, usually including a pentode tube directly coupled between the video-frequency detector and the control circuits of the reproducing device. In order to develop adequate power in the output circuit of such a stage, both the screen electrode and the anode of the tube include impedance-load circuits so as to permit the tube to operate within the power limits of the screen electrode and the anode electrode in such a manner as to develop an output signal of maximum power. In conventional circuits the impedance in the screen electrode circuit of such a stage is different for high-frequency and low-frequency components, and, due to known characteristics of a pentode type tube, such difference effectively causes the response of the stage to be nonuniform for the high-frequency and low-frequency components. As a result, the low-frequency or direct-current components of the video-frequency signal, including variations in the peak level of the synchronizing signals and the background illumination component, are translated through the stage with relatively less gain than are the higher frequency video components, the stage having relatively poor low-frequency response.

To compensate for this poor low-frequency response, circuits have been developed which utilize a low-frequency boost arrangement in the anode circuit of the tube to compensate for the discrimination by the screen electrode circuit against low-frequency or direct-current components. Such low-frequency boost circuits usually include an impedance network including a condenser coupled between the anode and cathode of the tube. These arrangements are usually effective in overcoming the undesired low-frequency degeneration of the screen electrode circuit but are sensitive to changes in any of the parameters of the stage and are, therefore, very critical. For example, if the potentials applied to the screen electrode and the anode tend to vary due to variations in the source of potential, the low-boost circuit may, if these variations are extensive, cause greater distortion in the output signal than would have occurred if no such circuit was present. Similar results may occur as a result of tube aging and when the pentode is replaced for any reason by another tube of the same type. Consequently, though the low-boost compensation is effective when properly arranged and proportioned and the parameters of the stage remain constant thereafter, because of the limitations just mentioned, such a solution is not entirely satisfactory.

It is an object of the present invention, therefore, to provide a new and improved wide-band direct-current repeater which avoids one or more of the disadvantages and limitations of the prior devices of this nature.

It is another object of the present invention to provide a wide-band direct-current repeater which has substantially uniform response for a wide range of frequency components including both high-frequency and low-frequency components.

It is an additional object of the present invention to provide a wide-band direct-current repeater in which changes in the operating potentials thereto, within reasonable limits, do not affect the uniformity of the response characteristics thereof.

It is a further object of the present invention to provide a wide-band direct-current repeater in which changes of the stage parameters, within reasonable limits, do not affect the uniformity of the response characteristics thereof.

It is a still further object of the present invention to provide a wide-band direct-current repeater which is highly stable and provides greater output power than previously obtainable when using similar tubes.

In accordance with a particular form of the invention, a wide-band direct-current repeater for translating a signal having components in a wide range of frequencies including low-frequency components comprises an electron-discharge device having in the space-current path thereof at least an anode, a cathode, a control electrode and a screen electrode. The repeater also includes a circuit for applying the aforementioned signal to the control electrode, potential-supply terminals for maintaining the anode and the screen electrode at operating potentials positive with respect to the cathode, and an anode load circuit for the device. The repeater also includes an impedance circuit connected across said terminals and having an intermediate terminal connected to the screen electrode and having an impedance varying substantially over the aforementioned frequency range thereby tending to cause the signal-translating characteristic of the device to vary substantially over the range. In addition, the repeater includes a conductive potential feed-back path between the anode and the screen electrode and having an impedance substantially equal to the reciprocal of the internal cross conductance between the screen electrode and anode of the tube to cause the signal-translating characteristic of the device to be substantially uniform over the frequency range.

For a better understanding of the present invention, together with other and further objects thereof, reference is had to the following description taken in connection with the accompanying drawings, and its scope will be pointed out in the appended claims.

In the drawings, Fig. 1 is a circuit diagram, partly schematic, of a complete television receiver including a wide-band direct-current repeater in accordance with a particular form of the present invention; Figs. 2*a*–2*d*, inclusive, are graphs utilized in explaining the operation of the repeater of Fig. 1; and Figs. 3–5, inclusive, are circuit diagrams of modified forms of the repeater represented in Fig. 1.

*General description of Fig. 1 receiver*

Referring now more particularly to Fig. 1 of the drawings, the television receiver there represented is of the superheterodyne type including an antenna system 10, 10 coupled to a radio-frequency amplifier 11 of one or more stages. There is coupled to the unit 11, in cascade, in the order named, an oscillator-modulator 12, an intermediate-frequency amplifier 13 of one or more stages, a detector 14, a wide-band direct-current repeater 15 to be described more fully hereinafter, and an image-reproducing device 16 of conventional construction provided with the usual line-frequency and field-frequency scanning coils 17 for deflecting the cathode-ray beam in two directions normal to each other. There is also coupled to the output terminals of the intermediate-frequency amplifier 13 a conventional sound-signal reproducer 18 which comprises the usual frequency detector, amplifiers and sound-reproducing device.

An output circuit of the detector 14 is coupled to input circuits of a line-scanning generator and a field-scanning generator 19 and 20, respectively, through a synchronizing-signal separator 21. The output circuits of the generators 19 and 20 are coupled in a conventional manner to the line-scanning and field-scanning coils 17, respectively.

The output circuit of an AGC circuit 51 coupled to the output circuit of the repeater 15 is connected to the input circuits of one or more of the tubes of the radio-frequency amplifier 11, the oscillator-modulator 12 and the intermediate-frequency amplifier 13 in a well-known manner.

It will be understood that the various units thus far described with respect to the receiver of Fig. 1, with the exception of the repeater 15, may be of conventional construction and operation so that a detailed description and explanation of the operation thereof are unnecessary herein.

*General operation of Fig. 1 receiver*

Considering briefly now the general operation of the above-described receiver as a whole, the television signals intercepted in the antenna system 10, 10 are selected and amplified in the radio-frequency amplifier 11 and applied to the oscillator-modulator 12 wherein they are converted into intermediate-frequency signals. The latter, in turn, are selectively amplified in the intermediate-frequency amplifier 13 and applied to the detector 14 where their modulation components having a wide range of frequencies including low frequencies are derived for application to the repeater 15. In the repeater, these components are amplified and applied to the intensity control circuit of the image-reproducing device 16 to modulate the intensity of the electron beam therein.

The synchronizing-signal components of the received signal are separated from the video-frequency components in the separator 21 and are used to synchronize the operation of the line-scanning and the field-scanning generators 19 and 20, respectively. These generators supply signals of saw-tooth wave form which are properly synchronized with reference to the transmitted television signal and applied to the scanning coils 17 of the cathode-ray tube 16, thereby to deflect the cathode-ray beam in the cathode-ray tube in two directions normal to each other to reproduce the image being televised at the transmitter.

The automatic-gain-control or AGC signal derived in the unit 51 from the peaks of the synchronizing signals translated through the repeater 15 is effective to control the amplification of one or more of the units 11—13, inclusive, to maintain the signal input to the detector 14 and to the sound-signal reproducer 18 within a relatively narrow range for a wide range of received signal intensities.

The sound-signal modulated wave signal accompanying the desired television wave signal is also intercepted by the antenna system 10, 10 and, after amplification in the unit 11, conversion to an intermediate-frequency signal in the unit 12 and further amplification in the amplifier 13, it is applied to the reproducer 18. In the unit 18, it is further amplified and its modulation components are detected, the latter components being utilized by a reproducing device to reproduce sound in a conventional manner.

*Description of wide-band direct-current repeater of Fig. 1*

Referring now more particularly to Fig. 1 of the drawings, the wide-band direct-current repeater 15 for the television receiver comprises a direct-current video-frequency amplifier including an electron-discharge device, such as a pentode 30, having in the same space-current path an anode 31, a cathode 32, a control electrode 33 and a screen electrode 34. The repeater also includes a circuit for applying the video-frequency signal derived in the detector 14 to the control electrode 33. In particular, this circuit comprises a pair of input terminals 35, 35 and a conductor 36 providing a conductive path between the electrode 33 and the output circuit of the detector 14. The repeater also comprises potential-supply terminals 29, 29 for connection to a source of potential B for maintaining the anode 31 and the screen electrode 34 at operating potentials positive with respect to the cathode 32 and also includes an anode load circuit, specifically a resistor 37, connected between the anode 31 and the one terminal 29 connected to the potential-supply +B terminal. The other terminal 29 is connected to the cathode and to ground.

The repeater also includes an impedance circuit having an impedance varying substantially over the aforementioned frequency range of the signals applied to the control electrode 33 thereby tending to cause the signal-translating characteristic of the tube 30 to vary over the range. More particularly, this impedance circuit comprises series-connected resistor 38 and condenser 39 connected between the terminals 29, 29 and connected to each other and to the screen electrode 34 through the terminal 28.

The repeater also includes a conductive potential feed-back path between the anode 31 and the screen electrode 34, this path having an impedance proportioned with relation to the internal cross conductance between the screen electrode and anode of the tube and with relation to the impedance parameters of the aforementioned load circuit and impedance circuit to cause the signal-translating characteristic of the stage including the pentode 30 to be substantially uniform over the aforementioned frequency range. More particularly, the feed-back path comprises a resistor 40 connected between the anode 31 and the screen electrode 34 proportioned as described hereinafter.

The anode 31 is also connected through a terminal 41 to the control electrode of the cathode-ray tube in the image-reproducing device 16. The cathode 32 is coupled to a suppressor electrode of the tube 30 and to the terminal 29 connected to —B and to ground.

The value of the resistor 40, hereinafter referred to as $R_{40}$, in ohms is defined ideally by the equation:

$$R_{40}=\frac{1}{\frac{\partial I_p}{\partial E_s}} \qquad (1)$$

where $E_s$ is the screen potential in volts,
$I_p$ is the anode current in amperes, and $$\frac{\partial I_p}{\partial E_s}$$

is the incremental change in anode current for an incremental change in screen potential and represents the internal cross conductance between the screen and anode of the tube.

The internal cross conductance between the screen and anode of a tube can be determined from a tube handbook or by experiment.

Having determined the value of the resistor $R_{40}$, the values of the resistors 37 and 38, hereinafter designated as $R_{37}$ and $R_{38}$, may be found by a conventional preliminary determination of what conventional anode and screen resistors are required to cause the pentode 30 to have the desired signal-translating characteristic. Such information is obtainable or at least determinable from the tube characteristics in conventional tube handbooks. The video-frequency signal anode load circuit for the tube 30 comprises the parallel circuit of the resistor $R_{37}$ and the resistor $R_{40}$, the condenser 39 providing a low-impedance path for video-frequency signals. The resistance of the anode resistor $R_{37}$ in ohms is then:

$$R_{37}=\frac{R_{40}R_v}{R_{40}-R_v} \qquad (2)$$

where $R_v$ is the value in ohms of the load resistor that would be conventionally employed, and
$R_{40}$ is the value in ohms of the resistor 40 as determined by Equation 1.

The resistance of the screen resistor $R_{38}$ may also be defined. It is a conventional characteristic of pentodes that, over the normal operating range:

$$\frac{I_s}{I_p}=c \qquad (3)$$

where $I_s$=screen current in amperes
$I_p$=anode current in amperes
$c$=a constant.

By utilizing the relationship of Equations 3 and 2, in view of the parallel path provided by the resistor 38 and the resistors 37 and 40 effectively in series with the resistor 38, it can be shown that:

$$R_{38}=\frac{(R_{37}+R_{40})R_{ss}}{R_{40}+\left(\frac{c+1}{c}\right)R_{37}-R_{ss}} \qquad (4)$$

where the values for all of the resistors are in ohms, and $R_{ss}$ is the value of the screen resistor that would be conventionally employed.

The capacitance of the condenser 39 is proportioned to by-pass the video-frequency signals and may have similar capacitance or a much smaller capacitance than similar condensers in prior such circuits.

*Operation of wide-band direct-current repeater of Fig. 1*

Considering now the operation of the repeater 15 of Fig. 1, there is applied to the control electrode of the tube 30 through the terminal 35 a composite video-frequency signal including components having frequencies ranging from 0 to 4 megacycles. The high frequencies represent the picture definition information whereas the low frequencies represent the average background or illumination information of the picture and the variation in synchronizing-signal peak level. Thus, the low frequencies represent the long term variation in illumination level of images from black to white. The pentode 30 acts in a conventional manner to amplify the composite video-frequency signal and develop an output signal in the anode circuit of the tube to be applied through the terminal 41 to the control electrode of the image-reproducing device 16. In order to obtain adequate power in the output circuit of unit 15 without exceeding the power limitations of the screen electrode 34, the protective load resistor 38 is included in the screen electrode circuit. The condenser 39 is utilized to by-pass certain signal components to ground to prevent degeneration in the screen electrode 34. Ignoring for the moment the effect of the resistor 40, for signals having high frequencies the condenser 39 acts as an effective by-pass path, but for lower frequencies as determined by the screen circuit time-constant characteristic, the impedance of a circuit including the condenser 39 becomes appreciable and the resistor 38 becomes the only practical by-pass path for the flow of current in the screen electrode circuit resulting from the low-frequency components. This flow of current causes a change in the screen electrode direct-current potential resulting in a degenerative reduction in the gain of the direct-current and low-frequency components translated through the tube. Specifically, there is an effective decrease in the amplification of the low-frequency signal components translated through the tube 30, the magnitude of this effect being principally determined by the internal cross conductance between the screen and anode of the tube 30.

The direct-current feedback and low-frequency boost circuit included in the anode circuit of the tube and comprising the resistor 40 and the condenser 39 compensates for the above-described direct-current and low-frequency degeneration and nonuniform response caused by the change in the series impedance characteristics of the screen electrode circuit. With the elements 39 and 40 proportioned as described above, this circuit increases the amplification in the anode circuit for these low frequencies by an amount equal and opposite to the decrease caused by the change in impedance characteristic in the screen electrode circuit. The resistor 40, in combination with the condenser 39, effectively neutralizes the effects caused by the internal cross conductance between the screen electrode and anode of the tube, providing a feed-back path between the anode and screen electrode to diminish the screen electrode degeneration effects. As a result, the signal-translating characteristic of the tube 30 is made to be substantially uniform over the desired frequency range.

Figure 2A:
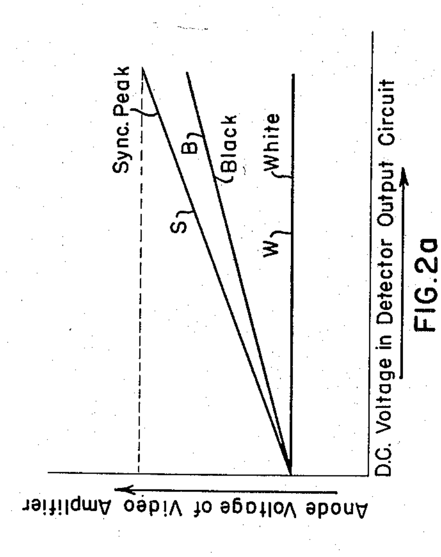
Figure 2B:
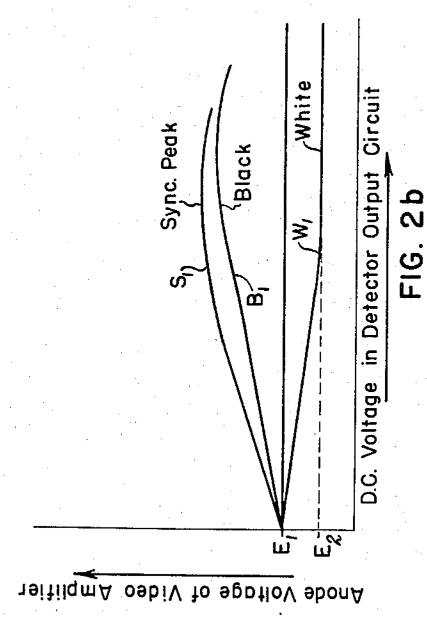
Figure 2C:
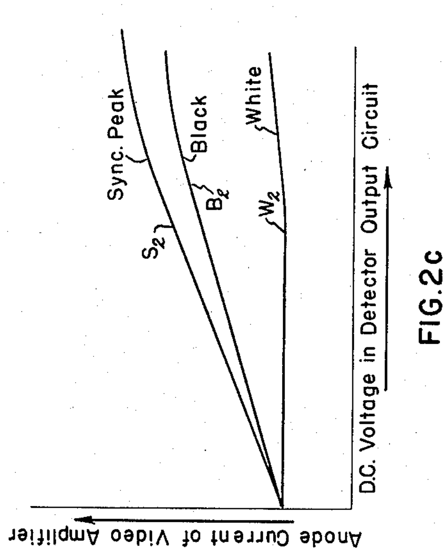

The above-described effects and the manner in which the circuit including the tube 30 acts to compensate therefor may be better understood by reference to the graphs of Figs. 2*a*–2*c*, inclusive. Each of these graphs is a plot of the change in anode response of the video-frequency amplifier 30 with respect to the signal developed in the output circuit of the detector 14 of Fig. 1. The curves S, B and W of Fig. 2*a* represent the desired anode voltages corresponding to the synchronizing signal, black level and white level, respectively, of an amplified video-frequency signal and are theoretically obtainable by utilizing a direct-coupled amplifier having uniform signal-translating characteristics over the frequency range 0 to 4 megacycles. More specifically, the abscissa of the curves of Fig. 2*a*, as well as of the curves of Figs. 2*b* and 2*c*, is in terms of the average amplitude of the signal developed in the output circuit of the detector, this signal representing the average illumination or background of the image. For each of such backgrounds, the high-frequency signals representative of the black-to-white detail of the image are represented by the levels of the curves W and B. It is desirable to develop the same voltage in the anode circuit of the amplifier for white regardless of the amplitude of the signal developed in the output circuit of the detector and applied to the control electrode of the amplifier. In addition, in order to assure that the action of the AGC circuit is degenerative and dependent only on signal-carrier amplitude, it is essential that the level of the synchronizing-signal peaks, from which the AGC potential is conventionally derived, be independent of the video-frequency content of the translated signal and proportional to the corresponding peaks in the output circuit of the detector 14.

The related synchronizing signal, black-level and white-level curves $S_1$, $B_1$ and $W_1$, respectively, of Fig. 2*b* represent the signal-translating characteristic of a video-frequency amplifier having a poor low-frequency signal-translating characteristic. Thus, it is seen that as the background signal increases in amplitude, that is, as the voltage of the direct-current signal applied to the control electrode of the video-frequency amplifier increases, the signal developed in the anode circuit of the amplifier for white does not remain constant but changes and the synchronizing-signal peaks no longer represent the true peak level of the video-frequency signal. For very low amplitude signals representative of one type of image background, if white in such an image is considered, a potential $E_1$ is developed at the anode of the conventional video-frequency amplifier tube. If signals of higher amplitude representative of another type of image background are translated, again considering white in the image with the latter background, a potential $E_2$ is developed in the anode circuit of the amplifier to represent such white. Since $E_1$ and $E_2$ are different potentials for white in different images, it is apparent that the video-frequency amplifier has nonuniform gain related to the potential of the substantially unidirectional background signal. Signals representative of the black level and of the peaks of the synchronizing pulses are translated with similar nonlinearity. As a result, the illumination of the reproduced image is not accurately reproduced. In addition, the AGC potential developed from the synchronizing-signal peaks, especially when the video-frequency signal is of such an amplitude that the control potential is derived from synchronizing signals occurring at those points along the curve $S_1$ having a downward slope, tends to cause regeneration instead of degeneration. It is apparent that no automatic gain control is developed for those signals where the synchronizing-signal peaks remain substantially constant in amplitude, as represented by the flat portion of the curve $S_1$, regardless of changes in the amplitude of the signals. Referring now to the curves of Fig. 2c, the curves $S_2$, $B_2$ and $W_2$, respectively, represent the anode voltages of the tube 30 corresponding to the synchronizing peaks, the black level and the white level of video-frequency signals translated through the tube 30 in accordance with the teaching of the present invention. It is seen that the utilization of a direct-current feedback and low-boost circuit including the resistor 40 and the condenser 39 in the anode circuit of the tube 30 substantially overcomes the effect represented in Fig. 2b. Over a wide range of signals representative of a wide range of image backgrounds and developed in the detector output circuit, the signal-translating characteristic of the video-frequency amplifier is substantially uniform.

Figure 2D:
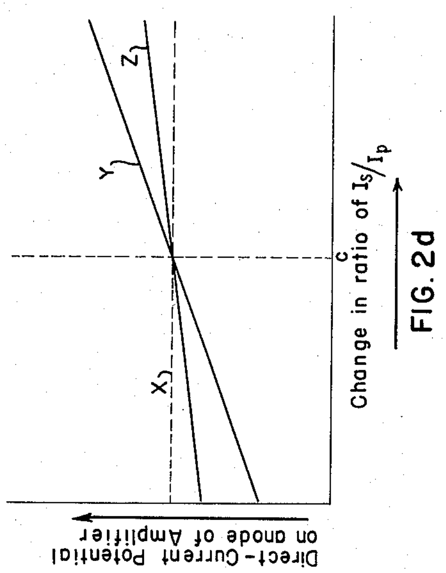

The wide-band direct-current repeater 15 of Fig. 1 includes another characteristic which is effective to diminish the undesired effects of conventional low-boost circuits employed in the anode circuit of the video-frequency amplifier. In the conventional type of low-boost arrangement previously discussed herein, there tends to be a change in the magnitude of the low boost effected with variations in the parameters of the amplifier. Thus, aging of the tube 30, variations in the magnitude of the potential +B or replacement of the tube 30 with other tubes of similar type but with inherent differences in characteristics may cause the conventional type of anode low-boost circuit to undercompensate or overcompensate for the effects of the screen electrode circuit. As a practical matter, a conventional type of anode low-boost circuit may be very critical and the parameters thereof may have to be changed for every substantial change of the amplifier parameters. In the amplifier circuit of Fig. 1, the conductive potential feedback path between the anode 31 and the screen electrode 34 provided by the resistor 40, which path also includes a portion of the low-boost circuit, permits the above-mentioned parameters to be changed over a wider range than previous amplifier circuits permitted without substantial change in the uniformity of the signal-translating characteristic of the amplifier. It is to be understood, as indicated previously, that changes in these parameters will cause the constant *c* to be different for each set of parameters. Referring to Fig. 2d, there is presented a plot of the variation in anode direct-current potential in an amplifier including an anode low-boost circuit caused by changes in the constant *c* defined by Equation 3 above. These changes are usual when a tube such as the tube 30 is replaced by another tube of the same type. Curve X represents the desired anode direct-current potential; curve Y represents the anode direct-current potential variation when a conventional type of low-boost circuit is employed; and curve Z represents the variation when the present invention is utilized. It is seen that when the present invention is employed, the response of the anode circuit to low-frequency or direct-current components is more uniform, in spite of variation in the value of *c*, than is the conventional type of anode circuit. This increased stability substantially increases the practicability of direct-connected amplifiers of the type represented by repeater 15.

It is seen that the direct-current repeater 15 of Fig. 1 is arranged to have a uniform signal-translating characteristic over a wide range of frequencies which characteristic is quite stable with substantial variations in the parameters of the repeater 15. This stability is effected by a feed-back path 40 which causes the screen electrode potential to be dependent to a large degree on the anode potential. It should also be noted that the Equations 1–4, inclusive, define the parameters of the repeater 15 in such manner that the anode and the screen electrode may be supplied from the same source of potential or each may be supplied from a different source of potential.

While applicant does not intend to be limited to any particular circuit parameters, the following parameters have been employed in a repeater in accordance with the present invention as represented by Fig. 1 for a selected value of *c* as defined by Equation 3.

| | |
|---|---|
| Tube **30** | Type 6AH6 |
| +B | 215 volts |
| Resistor 38 | 22,000 ohms |
| Resistor 37 | 10,000 ohms |
| Resistor 40 | 10,000 ohms |
| Condenser 39 | .47 microfarad |

Figure 5:
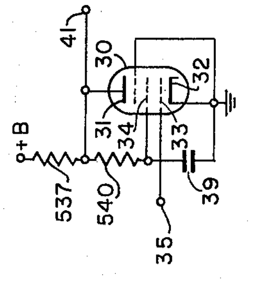

*Description and explanation of operation of repeaters of Figs. 3, 4 and 5*

The repeaters of Figs. 3, 4 and 5 are similar to the repeater of Fig. 1 and therefore similar components thereof are designated by the same reference numerals and analogous components by the same reference numerals with a factor of 300, 400 and 500, respectively, added thereto with respect to the reference numbers of Fig. 1. Referring now to Fig. 3, the resistors 340 and 338 are connected in series between the source of +B potential and the screen electrode 34, and the resistor 337 is connected between the junction of the resistors 340 and 338 and the anode 31 of the tube 30 to form an inverted Y network, whereas the similar resistors of Fig. 1 form a Δ network. Therefore, the values of the resistors 337, 338 and 340 may be determined by using the conventional Δ-Y transformation equation. Knowing the values of resistors 37, 38 and 40 of Fig. 1, the values of the resistors 337, 338 and 340 are defined as follows:

$$R_{340}=\frac{R_{37}R_{38}}{R_{37}+R_{38}+R_{40}} \quad (5)$$

$$R_{338}=\frac{R_{38}R_{40}}{R_{37}+R_{38}+R_{40}} \quad (6)$$

$$R_{337}=\frac{R_{37}R_{40}}{R_{37}+R_{38}+R_{40}} \quad (7)$$

Referring now to Fig. 4, the resistors 438 and 440 are connected in series between the source of +B potential and the anode 31, the junction of these resistors being connected to the screen electrode 34. With respect to the repeater of Fig. 5, the resistors 537 and 540 are connected in series between the source of potential +B and the screen electrode 34, the junction of these resistors being directly connected to the anode 31. The values of the resistors 440 and 540 may be determined by means of Equation 1 above and the values of the resistors 438 and 537 are then defined as follows:

$$R_{438}=\frac{R_v-R_{440}}{1+c} \quad (8)$$

where $R_v$ and $c$ are defined as in Equations 2 and 3 above.

$$R_{537}=\frac{R_{ss}-R_{540}}{1+\frac{1}{c}} \quad (9)$$

where $R_{ss}$ is defined as in Equation 4 above.

The operation of each of the repeaters of Figs. 3, 4 and 5 is similar to the operation of the repeater 15 of Fig. 1 and it is believed that no detailed explanation thereof is necessary.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A wide-band direct-current repeater for translating a signal having components in a wide range of frequencies including low-frequency components comprising: an electron-discharge device having in the space-current path thereof at least an anode, a cathode, a control electrode and a screen electrode; a circuit for applying said signal to said control electrode; potential-supply terminals for maintaining said anode and said screen electrode at operating potentials positive with respect to said cathode; an anode load circuit for said device; an impedance circuit connected across said terminals and having an intermediate terminal connected to said screen electrode and having an impedance varying substantially over said frequency range thereby tending to cause the signal-translating characteristics of said device to vary substantially over said range; and a conductive potential feed-back path between said anode and said screen electrode and having an impedance substantially equal to the reciprocal of the internal cross conductance between said screen electrode and said anode to casue said signal-translating characteristic of said device to be substantially uniform over said frequency range.

2. A wide-band direct-current video-frequency amplifier for translating a video-frequency signal having components in a wide range of frequencies including direct-current components comprising: a multielectrode vacuum tube having in the space-current path thereof at least an anode, a cathode, a control electrode and a screen electrode; a circuit for applying said signal to said control electrode; potential-supply terminals for maintaining said anode and said screen electrode at operating potentials positive with respect to said cathode; an anode load circuit for said tube; an impedance circuit connected across said terminals and having an intermediate terminal connected to said screen electrode and having an impedance varying substantially over said frequency range thereby tending to cause the signal-translating characteristic of said tube to vary substantially over said range, and a conductive potential feed-back path between said anode and said screen electrode and having an impedance substantially equal to the reciprocal of the internal cross conductance between said screen electrode and said anode to cause said signal-translating characteristic of said tube to be substantially uniform over said frequency range.

3. A wide-band direct-current television amplifier for translating a video-frequency signal having components in a wide range of frequencies including direct-current components comprising: an electron-discharge device having in the space-current path thereof at least an anode, a cathode, a control electrode and a screen electrode; a circuit for applying said signal to said control electrode; potential-supply terminals for maintaining said anode and said screen electrode at operating potentials positive with respect to said cathode; an anode load circuit for said device; a series-connected resistor and condenser connected across said terminals and having an intermediate terminal at the point of connection of said resistor and said condenser connected to said screen electrode and having an impedance varying substantially over said frequency range thereby tending to cause the signal-translating characteristic of said device to vary substantially over said range; and a conductive potential feed-back path between said anode and said screen electrode and having an impedance substantially equal to the reciprocal of the internal cross conductance between said screen electrode and said anode to cause said signal-translating characteristic of said device to be substantially uniform over said frequency range.

4. A wide-band direct-current repeater for translating a signal having components in a wide range of frequencies including low-frequency components comprising: an electron-discharge device having in the space-current path thereof at least an anode, a cathode, a control electrode and a screen electrode; a circuit for applying said signal to said control electrode; potential-supply terminals for maintaining said anode and said screen electrode at operating potentials positive with respect to said cathode; an anode load circuit for said device; an impedance circuit connected across said terminals and having an intermediate terminal connected to said screen electrode and having an impedance varying substantially over said frequency range thereby tending to cause the signal-translating characteristics of said device to vary substantially over said range; and a feed-back resistor between said anode and said screen electrode and having an impedance substantially defined by the equation $$R=\frac{1}{\frac{\partial I_p}{\partial E_s}}$$

where R represents said feed-back resistor in ohms, and $$\frac{\partial I_p}{\partial E_s}$$

is the incremental change in the current in said anode for an incremental change in the potential on said screen electrode, said feed-back resistor being effective to cause said signal-translating characteristic of said device to be substantially uniform over said frequency range.

5. In a television receiver a wide-band direct-current repeater for translating a signal having components in a wide range of frequencies including a direct-current component representative of the peak of said signal and utilized to effect automatic-gain control for said receiver comprising: an electron-discharge device having in the space-current path thereof at least an anode, a cathode, a control electrode and a screen electrode; a circuit for applying said signal to said control electrode; potential-supply terminals for maintaining said anode and said screen electrode at operating potentials positive with respect to said cathode; an anode load circuit for said device; an impedance circuit connected across said terminals and having an intermediate terminal connected to said screen electrode and having an impedance varying substantially over said frequency range thereby tending to cause the signal-translating characteristic of said device to be non-linear for said direct-current component thereby deleteriously to affect said automatic-gain control; and a conductive potential feed-back path between said anode and said screen electrode and having an impedance substantially equal to the reciprocal of the internal cross conductance between said screen electrode and said anode to cause said signal-translating characteristic of said device to be linear for said direct-current component thereby to develop the desired automatic-gain control of said receiver.

DONALD RICHMAN.

References Cited in the file of this patent

UNITED STATES PATENTS

| Number | Name | Date |
|---|---|---|
| 2,245,616 | Soller | June 17, 1941 |
| 2,424,847 | Prentiss | July 29, 1947 |

FOREIGN PATENTS

| Number | Country | Date |
|---|---|---|
| 600,884 | Great Britain | Apr. 21, 1948 |